March 2, 1954  E. H. WALLACE  2,670,777
ANTISKID TIRE
Filed Aug. 18, 1949
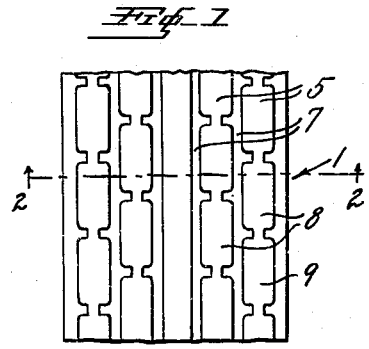
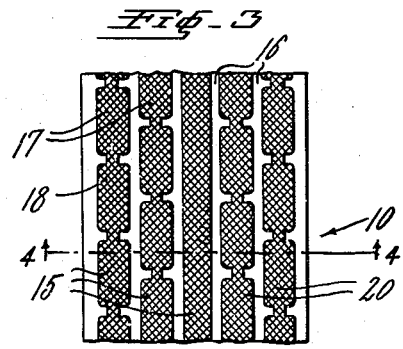
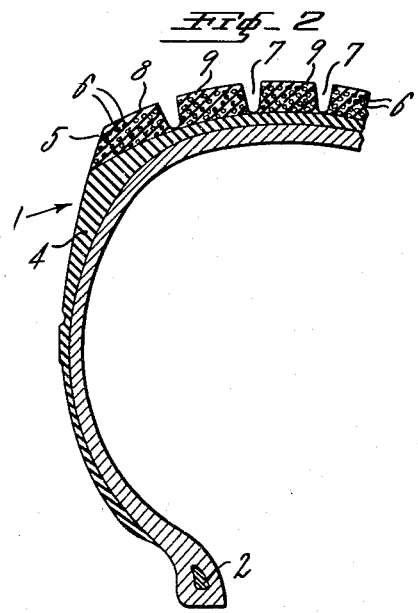
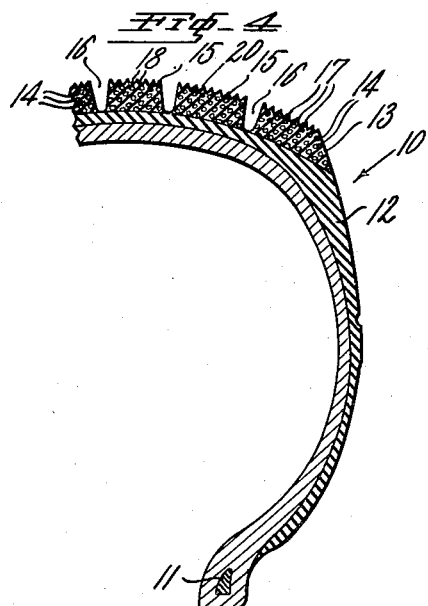
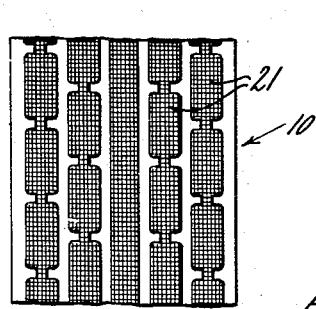
INVENTOR.
EDWARD H. WALLACE
BY
Henry P. Truesdell
ATTORNEY Patented Mar. 2, 1954

2,670,777

UNITED STATES PATENT OFFICE 2,670,777

ANTISKID TIRE

Edward H. Wallace, Detroit, Mich., assignor to United States Rubber Company, New York, N. Y., a corporation of New Jersey Application August 18, 1949, Serial No. 110,905

1 Claim. (Cl. 152—209)

This invention relates to anti-skid treads for pneumatic tires, and in particular, it relates to a tire tread having incorporated therein particulate material for the purpose of improving the anti-skid characteristics of the tire.

It has heretofore been proposed to incorporate in tire treads particulate materials, such as salt crystals, sawdust, sago, vermicelli, and the like. As the tire wears down, the particles become exposed. The exposed particles, if composed of readily friable material or water soluble material, such as vermicelli or salt crystals, either break up or dissolve in the presence of moisture and the tire friction so as to leave a multiplicity of cavities in the tire tread. These minute cavities provide the improvement in the tread surface resulting in better anti-skid properties. If the exposed particles are composed of insoluble and relatively infriable material, such as sawdust, they tend to remain in the surface of the tire, presenting a continuously renewed rough surface by reason of the unequal relative rates of wear of the rubber tire tread stock and the sawdust. However, during manufacture of the tire, it frequently happens that the rubber flows to the surface of the mold completely embedding the particles and thereby impairing the anti-skid properties of the tread during initial use. The instant invention overcomes this disadvantage by making the anti-skid properties available at the outset.

It is an object of the present invention to provide an improved anti-skid tire tread of the foregoing character containing particles which are exposed as the tire wears down, presenting a continually renewed rough surface.

Another object is the provision of an anti-skid tire tread containing particles, which has high anti-skid characteristics, particularly during its initial period of service.

A further object is to facilitate the exposure and/or voiding of the particles during the initial period of service of the tire so that the anti-skid advantages of the tread are available substantially as soon as the tire is put in use.

These and other advantages of the invention appear more fully in the following detailed description when considered in connection with the accompanying drawing, in which:

Fig. 1 is a fragmentary plan view of a pneumatic tire having a conventional tread containing particulate material;

Fig. 2 is a fragmentary sectional view of the tire on a larger scale taken along the line 2—2 of Fig. 1;

Fig. 3 is a fragmentary plan view of a tread containing particulate material embodying the features of my invention;

Fig. 4 is a fragmentary sectional view on a larger scale taken along the line 4—4 of Fig. 3; and Fig. 5 is a fragmentary plan view of a modification of the invention.

Referring to Figs. 1 and 2, the conventional tire shown therein is seen to comprise a tire casing 1, having inextensible bead elements 2, a sub-tread portion 4, and a tread portion 5. The tread portion 5 has incorporated therein particles 6, usually common rock salt crystals, although other particulate material, such as sawdust, sago, vermicelli, etc., may be used, and usually has an anti-skid configuration, such as a rib and block design defined by grooves 7. This design is molded in the surfaces of the tread during vulcanization of the tire in the conventional manner. During the molding operation, the rubber tends to flow at the surface 8 of the tread, with the result that the particles 6 are displaced inwardly from the surface of the tread leaving the surface 8 perfectly smooth and at the same time leaving a thin layer 9 of rubber which is substantially free of particles.

When such a conventional tread tire is initially put into service, the tire has only slightly better anti-skid characteristics on an icy or wet surface than an ordinary smooth surface tire containing no particulate material, because the road contacting surface 8 is practically smooth for the first 1,000 miles or so of service. This condition continues to exist because the outermost layer 9 of rubber adjacent the road contacting surface 8 of the tread contains substantially no particulate material, and the desired roughened surface is not produced immediately as the tire wears down during this period. For this reason the anti-skid benefits of the conventional tire tread containing salt or other particles may not be realized until the tire has been in service for a sufficient length of time to wear through the outer layer 9 of rubber into the underlying part of the tread containing the salt or other material. Therefore, until the tire has been in use for a short period the high anti-skid characteristics, particularly on icy and wet surfaces, are not realized.

It has been proposed to overcome the foregoing difficulties by grinding or buffing off the outer layer 9 of rubber from the surface of the tread before using the tire. However, this expedient is objectionable because it introduces an additional manufacturing operation, thereby adding to the expense of manufacturing the tire and increasing its cost, and because it also represents wastage of rubber.

Another proposed expedient is to press additional salt crystals or other particles into the surface of the unvulcanized tire tread before the tire is placed in the mold to be vulcanized, in order to avoid the salt-free layer 9. This is also unsatisfactory because of the additional labor and salt required, and because the excess salt is difficult to apply uniformly and tends to fall off.

According to my invention, the foregoing difficulties are avoided and a tire having improved anti-skid characteristics, even during its initial period of service, is obtained by providing the tread with a knurled road-contacting surface. Referring to Figs. 3 and 4, I show an embodiment of my invention in the form of a pneumatic tire casing 10, containing inextensible bead portions 11, a sub-tread portion 12, and a tread portion 13. The tread portion contains particles 14 usually salt crystals, sawdust, sago, or vermicelli, and has a suitable anti-skid configuration consisting of circumferential ribs and blocks 15 defined by grooves 16. A knurled design consisting of innumerable relatively sharp projections 17 defined by intersecting grooves 18, is provided in the road-contacting surface 20 of the tread, by vulcanizing the tire in a mold having its surface suitably engraved to form the desired knurling. Such a knurled surface has highly efficient anti-skid properties; and it is effective as soon as the new tire is first put in service. Thus, the knurling provides the desired initial anti-skid characteristics which are ordinarily obtained in the conventional salt tire or sawdust-containing tire, only after appreciable wear has taken place. As the knurling wears away, the particles 14 become exposed and present a rough surface, or, if friable and/or soluble, they are either broken up or dissolved out, leaving numerous irregularly disposed cavities of various sizes in the road-contacting surface of the rubber, providing an anti-skid surface of high efficiency, which is continually renewed as the tire wears down and additional particles are exposed and/or voided.

The sharp projections 17 and grooves 18 also have the effect of reducing the tendency of the rubber to displace the particles 14 inwardly during the molding operation, so that many of the particles are distributed immediately adjacent the knurled road-contacting surface 20 of the tread, and the particles are therefore available for exposure and/or voiding as soon as the knurling begins to wear away. In other words, the average distance between the outer particles and the surface of the tread is less in Fig. 4 than in Fig. 2. Because the surface of the improved tread is knurled, the particles are exposed with greater ease, that is, with relatively less wear of the surface, during the initial period of service.

It will be understood that many configurations of ridges or knurlings may be imparted to the surface 20 of the tread for accomplishing the purpose of this invention. Thus, instead of the generally pyramid shaped projections shown in Fig. 3, there may be employed other forms, such as the square knurling 21 shown in Fig. 5. Similarly, relatively fine circumferential ridges may be provided on the surface of the tread, or transverse or oblique ridges, or circular or sinuous ridges, or various combinations of the foregoing may be used. The rib and block design shown in the drawing may be replaced by any desired conventional tread design, or the surface of the tread may be free from any traction or anti-skid configuration other than the knurling.

The particles 14 may be any suitable anti-skid material, and are most commonly composed of inorganic salt, usually a halide salt such as common rock salt (sodium chloride), calcium chloride, etc., although insoluble materials such as sawdust, or readily friable materials such as vermicelli, may be used to advantage. The size of the particles should be such that approximately 72% of the particles will pass through a 16 mesh screen, or of such size that the major portion of the particles will be between a screen size of from 10 to 20 mesh. The amount of particulate material added to the rubber tread composition is usually equal to from 20% to 35% of the weight of the rubber composition of the tread. The particles may be added to the rubber composition in a conventional rubber mixing mill such as a Banbury mixer.

It is preferable that the knurling cover the major portion of the tread surface. The grooves defining the knurled surface, such as grooves 18 shown in the drawing, are preferably closely spaced, i. e., from 0.05 to 0.1 inch apart measured from the center of one groove to the center of the next. The depth of the groove is preferably 0.05 to 0.1 inch. Such shallow grooves are fleeting and wear away relatively rapidly, exposing the embedded particles after a brief period of use.

The improved tire tread of this invention may be provided on retreaded tires as well as new tires. To provide the improved surface by retreading, it is simply necessary to retread the tire with a strip of retread composition, known as camelback, containing particulate material, and to vulcanize the tread in a recapping mold suitably engraved to produce a knurled surface on the tread.

From the foregoing it is seen that the invention provides an improved tire tread containing particulate material, which has a knurled surface and therefor has highly effective initial anti-skid properties on snow, ice or other dangerous surfaces. The knurling substantially prevents displacement of the particles inwardly from the surface of the tread during vulcanization; and permits early exposure and/or voiding of the particles during the initial period of service to provide high anti-skid effectiveness even when the tire is new.

Having thus described my invention, what I claim and desire to protect by Letters Patent is:

A pneumatic tire having a rubber tread portion surmounting a sub-tread portion, said tread portion having a series of anti-skid grooves extending downwardly from the tread surface into the tread for a substantial depth and defining relatively elevated surface areas of the tread constituting the normal road-contacting surface of the tread, the said rubber tread portion containing anti-skid particles of from 10 to 20 mesh size distributed throughout the mass of the tread rubber, the proportion of said anti-skid particles in the tread rubber being from 20 to 35% of the weight of the rubber, the said normal road-contacting surface defined by said anti-skid grooves being relatively shallowly knurled, the said knurling being formed by relatively shallow, closely spaced grooves of from 0.05 to 0.1 inch in depth, said knurling providing for early rapid wear of the said normal road-containing surface, whereby the said anti-skid particles are exposed in the surface of the tread, thereby providing enhanced anti-skid action due to said exposure, substantially earlier in the life of said tire than would be provided if such knurling were not initially present.

EDWARD H. WALLACE.

References Cited in the file of this patent

UNITED STATES PATENTS

| Number | Name | Date |
|---|---|---|
| Re. 23,135 | Gapen | July 19, 1949 |
| 2,065,968 | Goltstein | Dec. 29, 1936 |
| 2,109,691 | D'Ayguesvives | Mar. 1, 1938 |
| 2,164,058 | Fowler | June 27, 1939 |
| 2,274,855 | Wallace | Mar. 3, 1942 |
| 2,340,392 | Lefcourt | Feb. 1, 1944 |
| 2,496,932 | Burkley | Feb. 7, 1950 |
| 2,504,090 | Sanderson | Apr. 11, 1950 |

FOREIGN PATENTS

| Number | Country | Date |
|---|---|---|
| 443,862 | Great Britain | Mar. 9, 1936 |